(12) United States Patent
Chanet et al.

(10) Patent No.: US 6,588,301 B1
(45) Date of Patent: Jul. 8, 2003

(54) DEVICE FOR TATTOOING ANIMALS

(75) Inventors: Jean-Pierre Chanet, Romaniat (FR); Thierry Humbert, Mezel (FR); Jean-Paul Landrevie, St. Martin la Chambre (FR)

(73) Assignees: Centre National du Machinisme Agricole du Genie Rural des Eaux et des Forets (CEMAGREF), Antony (FR); Landata-Cobiporc, Saint Gilles (FR)

( * ) Notice: Subject to any disclaimer, the term of this patent is extended or adjusted under 35 U.S.C. 154(b) by 0 days.

(21) Appl. No.: 10/030,571
(22) PCT Filed: Jul. 7, 2000
(86) PCT No.: PCT/FR00/01973
§ 371 (c)(1), (2), (4) Date: Apr. 15, 2002
(87) PCT Pub. No.: WO01/03500
PCT Pub. Date: Jan. 18, 2001

(30) Foreign Application Priority Data

Jul. 7, 1999 (FR) .......................................... 99 09042

(51) Int. Cl.$^7$ .............................................. B43K 5/00
(52) U.S. Cl. .......................... 81/9.22; 606/116; 606/186
(58) Field of Search ........................... 81/9.22; 101/26; 606/116, 186; 30/367

(56) References Cited

U.S. PATENT DOCUMENTS 3,039,467 A * 6/1962 Stone et al. .................. 30/367
4,488,550 A * 12/1984 Niemeijer .................... 81/9.22

* cited by examiner

Primary Examiner—D. S. Meislin
(74) Attorney, Agent, or Firm—Blakely, Sokoloff, Taylor & Zafman

(57) ABSTRACT

The present invention provides a device for tattooing animals, the device comprising a moving needle-carrier plate (4) whose needles (41) are designed to be covered in ink and to press, at the end of the stroke of the plate, against the skin (P) of an animal in order to tattoo it, and a spongy pad (6) soaked in ink lying on the path of the needles (41) and suitable for being pierced by the needles so that they project against the skin (P) of the animal at the moment of impact. It is remarkable in that said pad (6) is integrated with the plate (4), the assembly being moved by a hammer (8) housed in a guide barrel (5), and that said plate (4) is secured to the outside face (92) of a resilient diaphragm (9) which closes one end of said barrel (5).

7 Claims, 3 Drawing Sheets

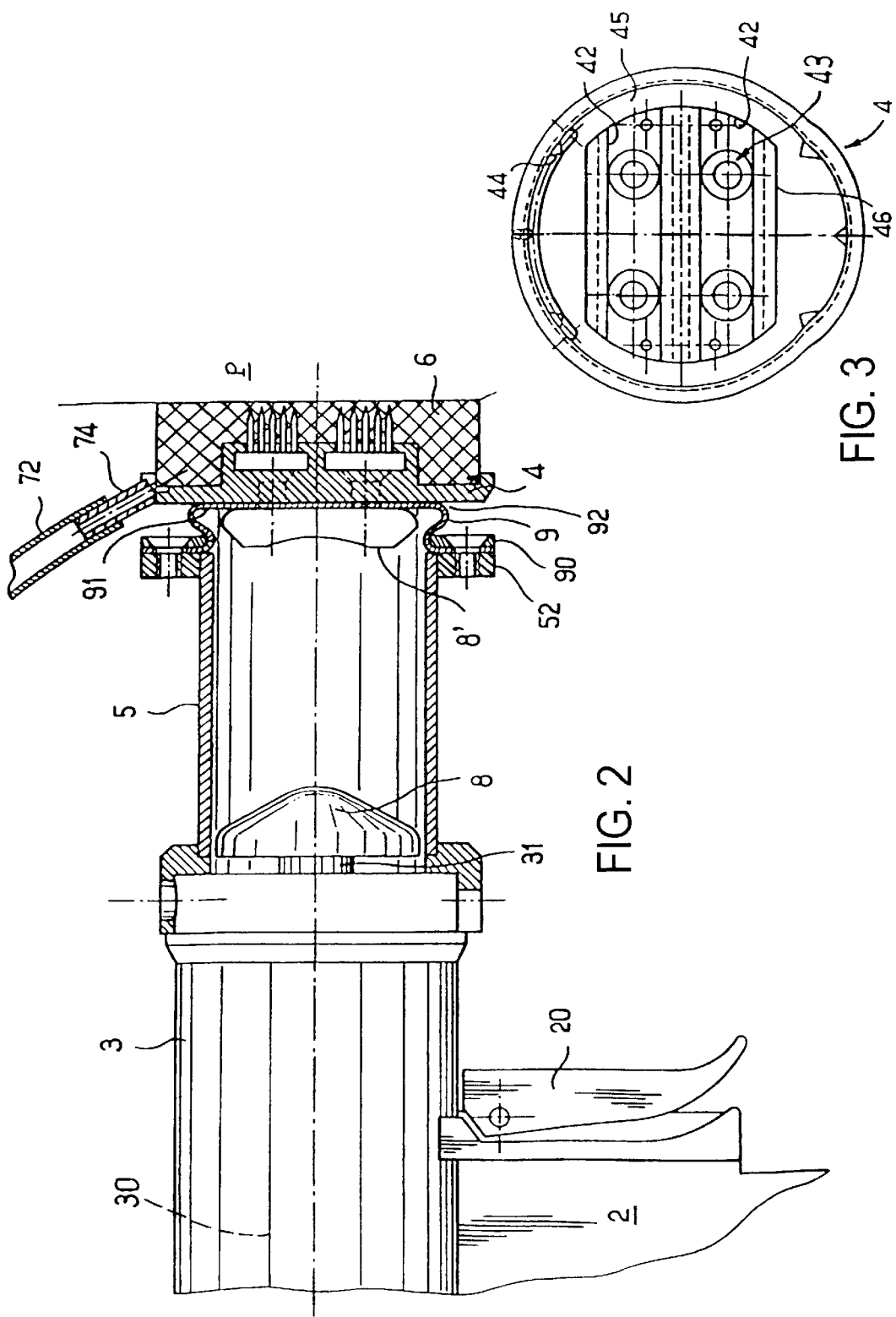

DEVICE FOR TATTOOING ANIMALS

The present invention relates to a device for tattooing animals.

It is particularly, but not exclusively, adapted to tattooing piglets.

The most widespread method of tattooing piglets for identification purposes consists in using an instrument that is generally in the form of a hammer, with the end of the instrument being provided with a support for tattooing characters.

The characters are formed by juxtapositions of needles.

To make a tattoo, the needles are initially inked by applying them against a sponge that has previously been impregnated in ink.

It will be understood that the quality of the tattoo depends on the somewhat random quantity of ink that comes into contact with the needles. The amount of ink that is transferred is relatively little if the ink in or on the sponge has begun to dry.

In addition, depending on the technique and the skill of operators, the amount of pain inflicted on animals by the strike itself can be greater and more traumatic than the pain generated by the needles penetrating into the skin.

Since tattooing is done "on-the-fly", the zone of impact on the skin of the animals is never exactly the same.

A device is also known that is in the form of a pistol which comprises a punch carrying characters, likewise comprising needles, and associated with the rod of an actuator. When the rod is extended, the punch is subjected to the same displacement, thus enabling it to perform tattooing.

The needles are inked in the same manner as before, i.e. by previously pressing the needles against a sponge. The "pistol" therefore needs to be used twice over, thus making it more likely that the ink will dry.

In addition, because of the rapid movement of the actuator rod, the ink tends to migrate towards the roots of the needles, so the marked characters are not very visible at the surface of the animal's skin.

Document DE-A-1 607 112 relates to improvements to devices for marking animals. That device comprises a head connected to an oscillating arm and provided with a series of needles.

In the embodiment of FIGS. 2 and 3, ink is conveyed via a tube to a dispenser piece which communicates with a porous mass.

The arm is guided in a sheath, such that the actuator mechanism of the head is similar to that of an actuator.

As shown in the above-specified figures, when not performing a tattooing operation, the needles are fully housed inside the mass which is designed to be compressible, and they only come out therefrom for the purpose of tattooing.

Document GB-A-2 234 420 discloses a tattooing device with a vibrating head, fitted with a series of needles.

It is stated that a mass of absorbent material, attached to the head, can be fed with ink. When the head is subjected to vibratory motion, the needles pass through the material and pick up ink. They are then immediately returned to the inside of the material and again directed towards the skin of the animal.

The devices described in those documents enable the problems raised above to be resolved in part.

Nevertheless, the moving members they comprise are not genuinely separate from the element that carries the needles. There is thus a high risk of the ink migrating towards these moving members, and that runs the risk of interfering with proper operation thereof.

The present invention therefore seeks to provide a tattooing device which in addition to providing a solution to the above-mentioned problems, also makes it possible to perform tattooing without the ink migrating towards moving parts.

The tattooing device can be used for marking animals without it being necessary to begin by inking the needles.

It makes it possible to perform tattooing of constant quality, without giving rise to significant trauma in animals.

The device of the present invention comprises a device for tattooing animals, the device comprising a moving needle-carrier plate whose needles are designed to be covered in ink and to press, at the end of the stroke of the plate, against the skin of an animal in order to tattoo it, and a spongy pad soaked in ink lying on the path of the needles and suitable for being pierced by the needles so that they project against the skin of the animal at the moment of impact.

It is characterized by the fact that said pad is integrated with the plate, the assembly being moved by a hammer housed in a guide barrel, and that said plate is secured to the outside face of a resilient diaphragm which closes one end of said barrel.

By means of this device, the needles are covered in ink at the moment they pass through the pad. There is no risk of the ink drying out and it is distributed uniformly over the entire surface of the needles as they pass through the body of the pad. Consequently, marking can be made to constant quality.

Furthermore, because the plate is secured to a resilient diaphragm which closes one end of the barrel, complete sealing is provided between said plate and the moving members.

According to other advantageous but non-limiting characteristics of the device:

the inside face of the diaphragm is secured to an anvil suitable for being struck by said hammer;

the slider, respectively the hammer, are secured to the rod of an actuator;

said pad is connected to ink-feeder means;

said feeder means comprise a storage receptacle connected to said pad via a flow tube;

said receptacle is placed in such a manner that the flow of ink towards the pad takes place under gravity; and said tube communicates with said pad, the pad being compressible so that it becomes impregnated with ink each time it expands to its initial non-compressed shape after being subjected to an impact.

Other characteristics and advantages of the present invention will appear on reading the following description of various particular embodiments. The description refers to the accompanying drawings, in which:

FIG. 2 is a fragmentary side view, also partially cutaway, showing a device in accordance with the invention;

FIG. 3 is a front view of the needle-carrying plate of the FIG. 2 device; and

Figure 1:
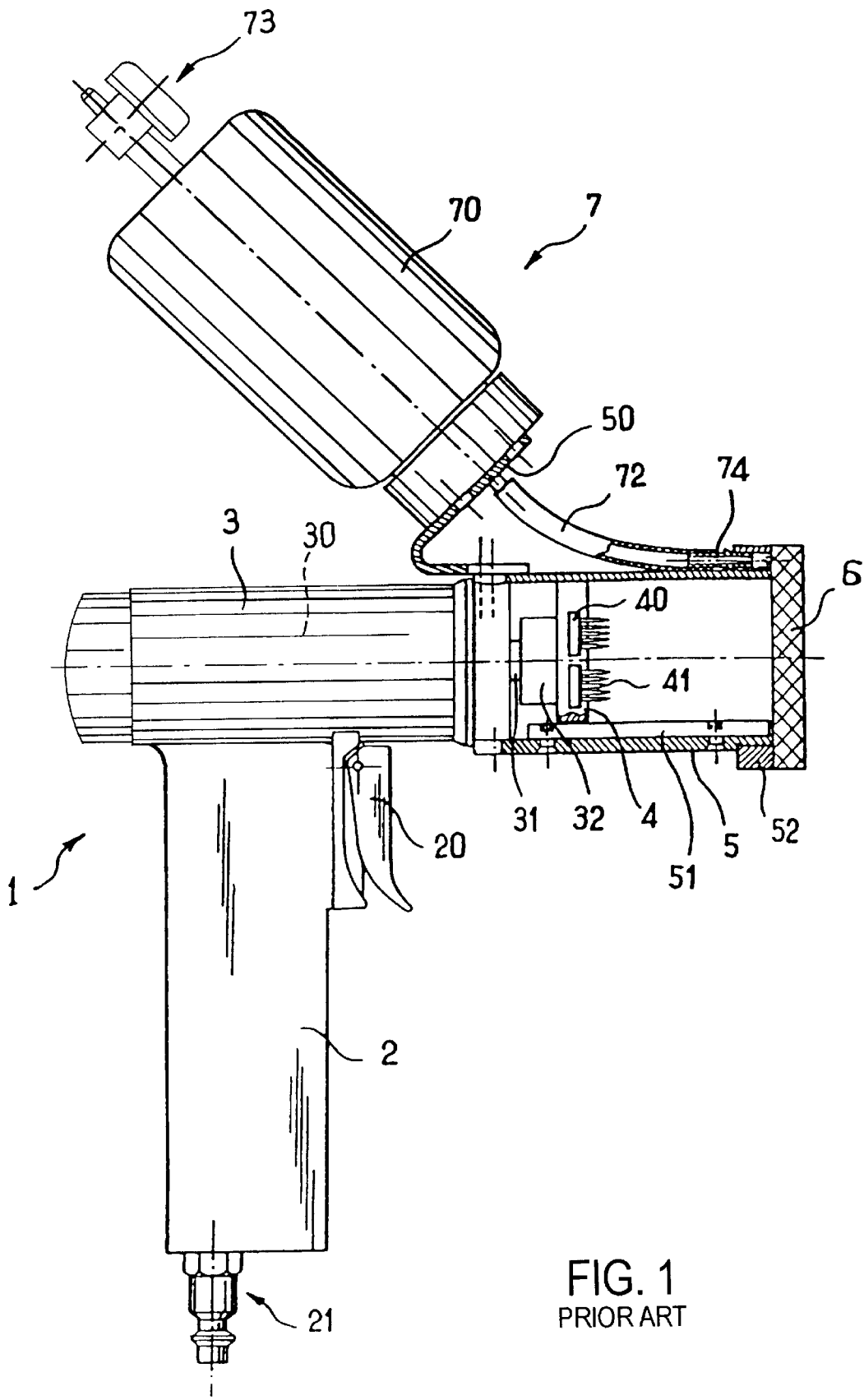
FIG. 1 is a partially cutaway side view of a tattooing device that operates in accordance with the state of the art.

The device 1 in FIG. 1 operates in a manner substantially similar to that of the state of the art mentioned above, and has the general appearance of a pistol.

It comprises a handle or grip 2, having a trigger 20 hinged near the top thereof.

A cylindrical body 3 extends perpendicularly to the grip and constitutes the cylinder of a double-acting actuator 30.

This actuator is preferably pneumatically driven and air is brought thereto via a tube (not shown) received in the hollow inside volume of the grip. FIG. 1 shows an endpiece 21 secured to said tube and projecting from the bottom end of the grip, thus enabling it to be connected to a source for feeding compressed air.

The rod 31 of the actuator 30 extends inside a cylindrical barrel 5 which extends the body 3.

Pressure applied on the trigger 20 causes the rod of the actuator to be extended.

The rod 31 is fixed via a coupling piece to a plate 4 carrying needles 41. The shape of the plate is suitable for enabling it to slide inside the barrel. It comprises a generally cylindrical part whose diameter corresponds to the inside diameter of the barrel 5 (ignoring clearance).

A spline 51 is fixed longitudinally inside the barrel 5 to guide the plate 4 as it moves in translation therein. To this end, said plate is provided with a notch for receiving the spline.

Needle supports 40 of T-shaped profile are received in grooves of complementary shape provided in the needle carrier 4.

Around the free end of the barrel that is remote from the actuator, there is fixed an annular piece 52 which serves as a support for a spongy pad 6 such as a sponge. The pad is in the form of a thick disk whose diameter corresponds to the outside diameter of the annular piece 52. The pad 6 thus closes the free end of the barrel.

The top portion of the barrel 5 carries a curved mounting piece 50 serving to support ink-feeder means 7.

These means comprise an ink storage receptacle 70 provided with an adjustment cock 73 of conventional type. the ink contained in the container flows under gravity via a tube 72 whose free end co-operates with an endpiece 74, itself engaged in an opening passing through the annular piece 52. Ink thus flows via the tube 72 and is absorbed by the spongy pad 6.

The structure of the device of the invention as shown in FIG. 2 is quite similar to that described above.

This means that the device comprises a grip 2, an actuator body 3, a barrel 5, and ink-feeder means 7.

Nevertheless, it differs in the following respects.

The actuator rod 31 carries a hammer-forming piece 8 at its free end that is somewhat bullet-shaped, i.e. it has a projecting central portion.

A washer 90 and a screw (not shown) serves to fix a resilient diaphragm 9 to the annular piece 52, thereby closing the free end of the barrel. By way of example, the diaphragm is made of rubber.

On its inside face 91, i.e. on its face looking towards the inside of the barrel 5, the diaphragm has an anvil-forming piece 8', whereas its opposite face carries a needle-carrying plate 4.

The anvil 8' is solid and its face looking towards the hammer 8 is shaped with a depression that is substantially complementary to the shape of the hammer.

The needle-carrier plate 4 is in the form of a disk 45 with a projecting portion 46.

FIG. 3 shows holes 43 for receiving screws that pass through the thickness of the diaphragm 9 and engage in the anvil, thus pinching the diaphragm. These holes are formed in the bottoms of T-shaped grooves 42 formed in the projecting portion 46 and suitable for receiving needle supports (not shown).

In this embodiment, the plate 4 carries a spongy pad 6 which is fixed thereto by a series of peripheral studs 44 of triangular shape.

The coupling 74 fitted to the ink flow tube opens out directly into the pad 6.

The way in which the device of the invention is used to tattoo an animal is described below.

In a first step, the pad 6 is pressed against the skin P of the animal to be tattooed, in the zone where it is desired to make a tattoo (see FIG. 2).

Figure 4:
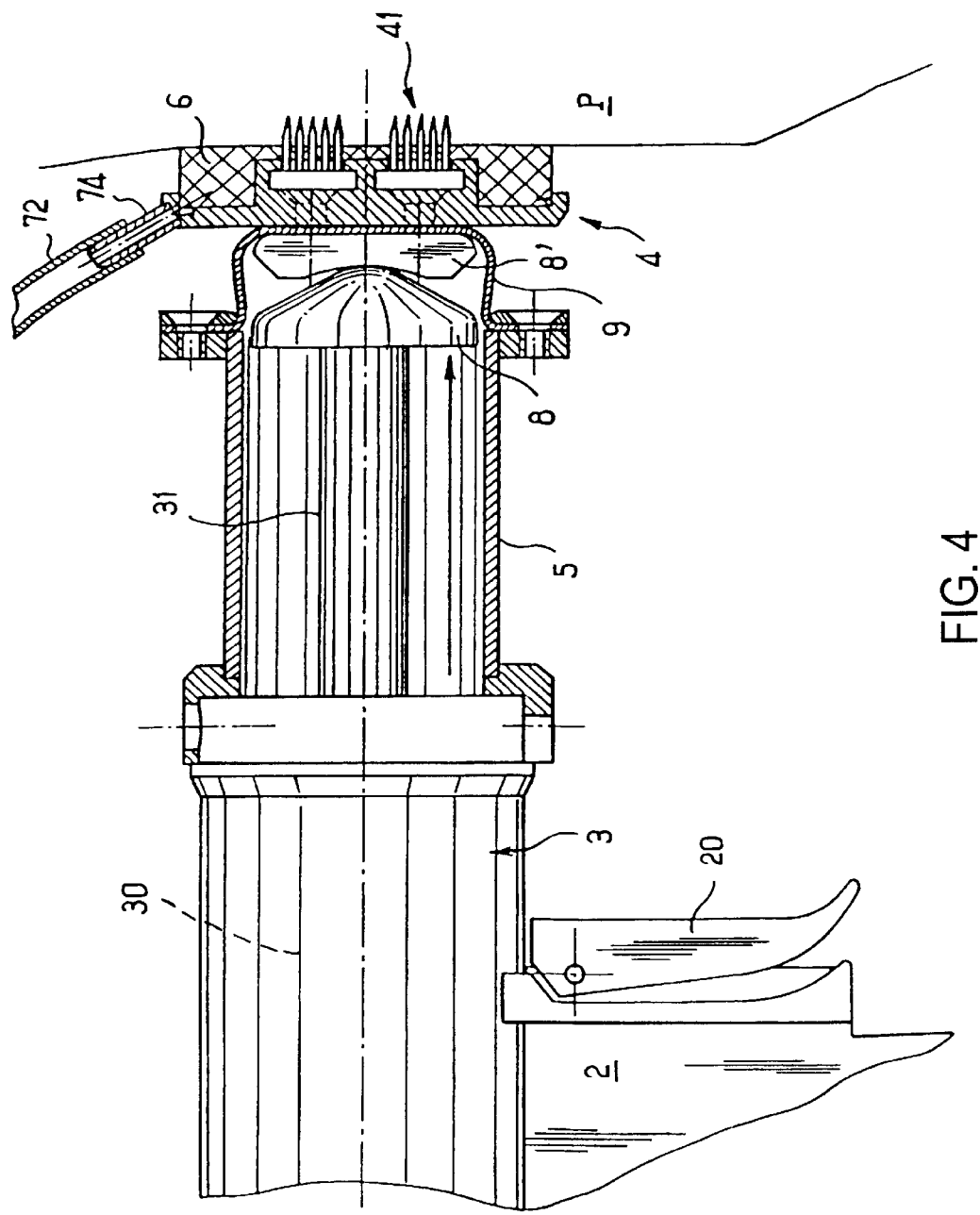
FIG. 4 is a view analogous to FIG. 2, to show how the device of the invention is used for tattooing.

Thereafter, the trigger 20 is squeezed so as to cause the rod 31 of the actuator to extend inside the barrel 5. This causes the hammer 8 to strike against the rear face of the anvil 8' so that the diaphragm 9 deforms axially (FIG. 4).

As a result, the needles 41 of the plate pass through the pad 6 while also compressing it. During this operation, it is the entire surface of each needle that becomes coated in ink, and the sharp tips thereof provide high quality marking.

When the trigger 20 is released, the rod 31 of the actuator is withdrawn progressively, so that the pad 6 returns to its initial expanded shape. This creates suction inside the pad serving to suck in the ink contained in the tube 72. This ensures that the pad continues to be impregnated in ink.

The ink in the pad is thus renewed regularly, thereby making it possible to perform repeated marking under constant-quality conditions.

In addition to enabling tattooing to be performed with constant quality, the structure of the device of the invention also makes it possible, because of the presence of the diaphragm 9, to ensure that the moving parts (rod 31 and hammer 8) are completely separate from the plate 4. It is thus not possible for ink to migrate into the device.

What is claimed is:

1. A device for tattooing animals comprising:

an assembly including a movable needle-carrier plate (4) having corresponding needles (41); and a spongy pad (6) integrated with the plate (4) soaked in ink lying on the path of the needles (41), the assembly being movable by a hammer (8) housed in a guide barrel (5), said plate (4) being secured to an outside face (92) of a resilient diaphragm (9) disposed at one end of said barrel (5).

2. A device according to claim 1, wherein an inside face (91) of the diaphragm (9) is secured to an anvil (8') adapted to be struck by said hammer (8).

3. A device according to claim 1, wherein the hammer (8) is secured to a rod of an actuator (30).

4. A device according to claim 1, wherein said pad (6) is coupled to an ink-feeder means (7).

5. A device according to claim 4, wherein said feeder means (7) comprise a storage receptacle (70) coupled to said pad (6) via a flow tube (72).

6. A device according to claim 5, wherein said receptacle (70) is disposed so that the flow of ink towards the pad (6) takes place under gravity.

7. A device according to claim 6, wherein said tube (72) communicates with said pad (6), the pad being compressible so that it becomes impregnated with ink each time it expands to its initial non-compressed shape after being subjected to an impact.

* * * * *